United States Patent
Liu et al.

(10) Patent No.: US 8,855,067 B2
(45) Date of Patent: Oct. 7, 2014

(54) MULTI-USER COMMUNICATION GROUP MANAGEMENT AND SIGNALING

(75) Inventors: Yong Liu, Campbell, CA (US); Harish Ramamurthy, Sunnyvale, CA (US); Raja Banerjea, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 454 days.

(21) Appl. No.: 13/077,623

(22) Filed: Mar. 31, 2011

(65) Prior Publication Data

US 2011/0243081 A1 Oct. 6, 2011

Related U.S. Application Data

(60) Provisional application No. 61/392,602, filed on Oct. 13, 2010, provisional application No. 61/379,330, filed on Sep. 1, 2010, provisional application No. 61/331,768, filed on May 5, 2010, provisional application No. 61/326,120, filed on Apr. 20, 2010, provisional application No. 61/320,460, filed on Apr. 2, 2010.

(51) Int. Cl.
  *H04W 4/08* (2009.01)
  *H04W 4/06* (2009.01)
  *H04W 72/04* (2009.01)
  *H04W 84/12* (2009.01)

(52) U.S. Cl.
  CPC . *H04W 4/08* (2013.01); *H04W 4/06* (2013.01); *H04W 84/12* (2013.01); *H04W 72/042* (2013.01)
  USPC .............................. 370/329; 370/302; 370/328

(58) Field of Classification Search
  CPC .... H04W 12/10; H04W 16/28; H04W 72/046
  USPC .......................................... 370/302, 328, 329
  See application file for complete search history.

(56) References Cited

U.S. PATENT DOCUMENTS 8,064,424 B2 * 11/2011 Sambhwani et al. ......... 370/342
8,724,546 B2 *  5/2014 Zhang et al. .................. 370/328

(Continued)

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Futher Higher Data Rate Extension in the 2.4 GHz Band," IEEE Std. 802.11g (2003), 69 pages.

(Continued)

*Primary Examiner* — Wei Zhao
*Assistant Examiner* — Robert M Morlan

(57) ABSTRACT

Systems and techniques relating to wireless communications are described. A described technique includes generating one or more assignment records for a wireless communication device, generating an assignment message that includes the one or more generated assignment records, and transmitting the assignment message to cause the wireless communication device to initialize or update a multi-user group table based on the assignment message and filter one or more received multi-user transmissions based on the multi-user group table. The assignment message can indicate one or more group identifiers and one or more group member identifiers that are assigned to the wireless communication device and one or more group identifiers that are not assigned to the wireless communication device.

24 Claims, 10 Drawing Sheets

| Action | Function | Number of MU groups (e.g., M) | MU Group #1 Record | | MU Group #2 Record | | MU Group #3 Record | |
|---|---|---|---|---|---|---|---|---|
| | | | GID | GMI | GID | GMI | GID | GMI |

(56) References Cited

U.S. PATENT DOCUMENTS

| | | | |
|---|---|---|---|
| 2006/0164969 A1* | 7/2006 | Malik et al. | 370/203 |
| 2007/0104162 A1 | 5/2007 | Kneckt et al. | |
| 2008/0080437 A1 | 4/2008 | Krishnaswamy et al. | |
| 2008/0295144 A1* | 11/2008 | Cam-Winget et al. | 726/1 |
| 2009/0092110 A1 | 4/2009 | Taki et al. | |
| 2009/0279500 A1 | 11/2009 | Luo et al. | |
| 2010/0248635 A1 | 9/2010 | Zhang et al. | |
| 2010/0260138 A1 | 10/2010 | Liu et al. | |
| 2011/0038332 A1 | 2/2011 | Liu et al. | |
| 2011/0064040 A1* | 3/2011 | Kim et al. | 370/329 |
| 2011/0134900 A1 | 6/2011 | Liu et al. | |
| 2011/0188598 A1* | 8/2011 | Lee et al. | 375/267 |
| 2013/0070748 A1* | 3/2013 | Abraham et al. | 370/338 |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification", IEEE Std. 802.11n, 2005, 131 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 535 pages.

International Search Report and Written Opinion for U.S. Appl. No. PCT/US2010/029275, mailed Aug. 12, 2010, 14 pages.

Jin, Kim Hyeon, Authorized Officer, Korean Intellectual Property Office, PCT International Application No. PCT/US2011/030993, in International Search Report, mailed Nov. 15, 2011, 9 pages.

Joonsuk, Kim et al., "GroupID Concept for Downlink MU-MIMO Transmissions," IEEE 802.11-10/0073r2, Mar. 15, 2010.

Lee, Jeong Su, Authorized Officer, Korean Intellectual Property Office, PCT International application No. PCT/US2010/059777, in International Search Report, mailed Aug. 25, 2011, 8 pages.

"Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks," IEEE Std 802.3ac-1998, 1998, 19 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

Zhang et al., "Narrow-Band OFDM Mode for WLAN," U.S. Appl. No. 12/789,325, filed May 27, 2010, 66 pages.

Rosken, Wilfriend, Authorized Officer, European Patent Office, PCT International Application No. PCT/US2010/056619, in International Search Report mailed Mar. 2, 2011, 10 pages.

\* cited by examiner

Fig. 8A

| Action | Function | Number of STAs (e.g., N) | AID #1 | AID #2 | ... | AID #N | Number of MU groups (e.g., M) | MU Group #1 Record | ... | MU Group #M Record |

| Action | Function | Number of MU groups (e.g., M) | MU Group #1 Record [GID | GMI] | MU Group #2 Record [GID | GMI] | MU Group #3 Record [GID | GMI] |

806 / 811 / 826 / 850a / 850b / 850c — 801

| GMI | SSI = 1 | SSI = 2 | SSI = 3 | SSI = 4 | SSI = 5 | SSI = 6 | SSI = 7 | SSI = 8 |
|---|---|---|---|---|---|---|---|---|
| GID=1 | 1 | 2 | 3 | 4 | 1 | 2 | 3 | 4 |
| GID=2 | 1 | 2 | 3 | 1 | 4 | 2 | 3 | 4 |
| GID=3 | 1 | 2 | 3 | 1 | 2 | 4 | 3 | 4 |
| GID=4 | 1 | 2 | 1 | 2 | 3 | 4 | 3 | 4 |
| GID=5 | 1 | 2 | 3 | 1 | 2 | 3 | 4 | 4 |
| GID=6 | 1 | 2 | 1 | 3 | 4 | 2 | 3 | 4 |
| GID=7 | 1 | 1 | 2 | 2 | 3 | 3 | 4 | 4 |
| GID=8 | 1 | 2 | 1 | 3 | 2 | 4 | 3 | 4 |
| GID=9 | 1 | 1 | 2 | 3 | 4 | 2 | 3 | 4 |
| GID=10 | 1 | 1 | 2 | 3 | 2 | 3 | 4 | 4 |
| GID=11 | 1 | 1 | 2 | 2 | 3 | 4 | 3 | 4 |

MULTI-USER COMMUNICATION GROUP MANAGEMENT AND SIGNALING

CROSS REFERENCE TO RELATED APPLICATIONS

This disclosure claims the benefit of the priority of the following applications: U.S. Provisional Application Ser. No. 61/392,602, filed Oct. 13, 2010; U.S. Provisional Application Ser. No. 61/379,330, filed Sep. 1, 2010; U.S. Provisional Application Ser. No. 61/331,768, filed May 5, 2010; U.S. Provisional Application Ser. No. 61/326,120, filed Apr. 20, 2010; and U.S. Provisional Application Ser. No. 61/320,460, filed Apr. 2, 2010. This disclosure is related to U.S. patent application Ser. No. 12/850,529, filed Aug. 4, 2010, and now published as U.S. Patent Pub. No. 2011/0038332. The applications referenced above are incorporated herein by reference.

BACKGROUND

This disclosure relates to wireless communication systems, such as Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, or IEEE 802.11 ac, can use OFDM to transmit and receive signals.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

SUMMARY

The present disclosure includes systems and techniques for wireless communications.

According to an aspect of the present disclosure, a technique for wireless communications includes maintaining assignment records for multi-user communication groups, the assignment records being used to communicate with one or more wireless communication devices, the assignment records including an assigned group identifier and an assigned group member identifier, the assigned group identifier identifies at least one of the multi-user communication groups, the assigned group member identifier identifies at least one spatially steered stream within a multi-user transmission that is associated with the assigned group identifier. The technique includes generating one or more assignment records for a wireless communication device, generating an assignment message that includes the one or more generated assignment records, and transmitting the assignment message to cause the additional wireless communication device to initialize or update a multi-user group table based on the assignment message and filter one or more received multi-user transmissions based on the multi-user group table. Multi-user group table can be implemented using one or more vectors, a matrix, a linked list, or a combination thereof. Other types of data structures are possible for implementing a multi-user group table. The assignment message can indicate one or more group identifiers and one or more group member identifiers that are assigned to the additional wireless communication device and one or more group identifiers that are not assigned to the additional wireless communication device.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Details of one or more implementations are set forth in the accompanying drawings and the description below. Other features and advantages may be apparent from the description and drawings, and from the claims.

DESCRIPTION OF THE DRAWINGS

FIG. 8A shows an example of a layout of a group identifier management frame format for a broadcast transmission.

FIG. 8B shows an example of a layout of a group identifier management frame format for a unicast transmission.

FIG. 10 shows an example of a mapping table for a homogeneous spatial grouping technique.

Like reference symbols in the various drawings indicate like elements.

DETAILED DESCRIPTION

This disclosure provides details and examples of technologies for wireless local area networks, including, among other things, systems and techniques for multi-user group assignments for multi-user wireless communications. The techniques and architectures presented herein can be implemented in a variety of wireless communication systems—for example, communication systems based on IEEE 802.11n or IEEE 802.11ac. One of more of the described systems and techniques can be combined with technology disclosed by U.S. patent application Ser. No. 12/850,529, filed Aug. 4, 2010, now published as U.S. Patent Pub. No. 2011/0038332, and entitled "SDMA MULTI-DEVICE WIRELESS COMMUNICATIONS."

Figure 1:
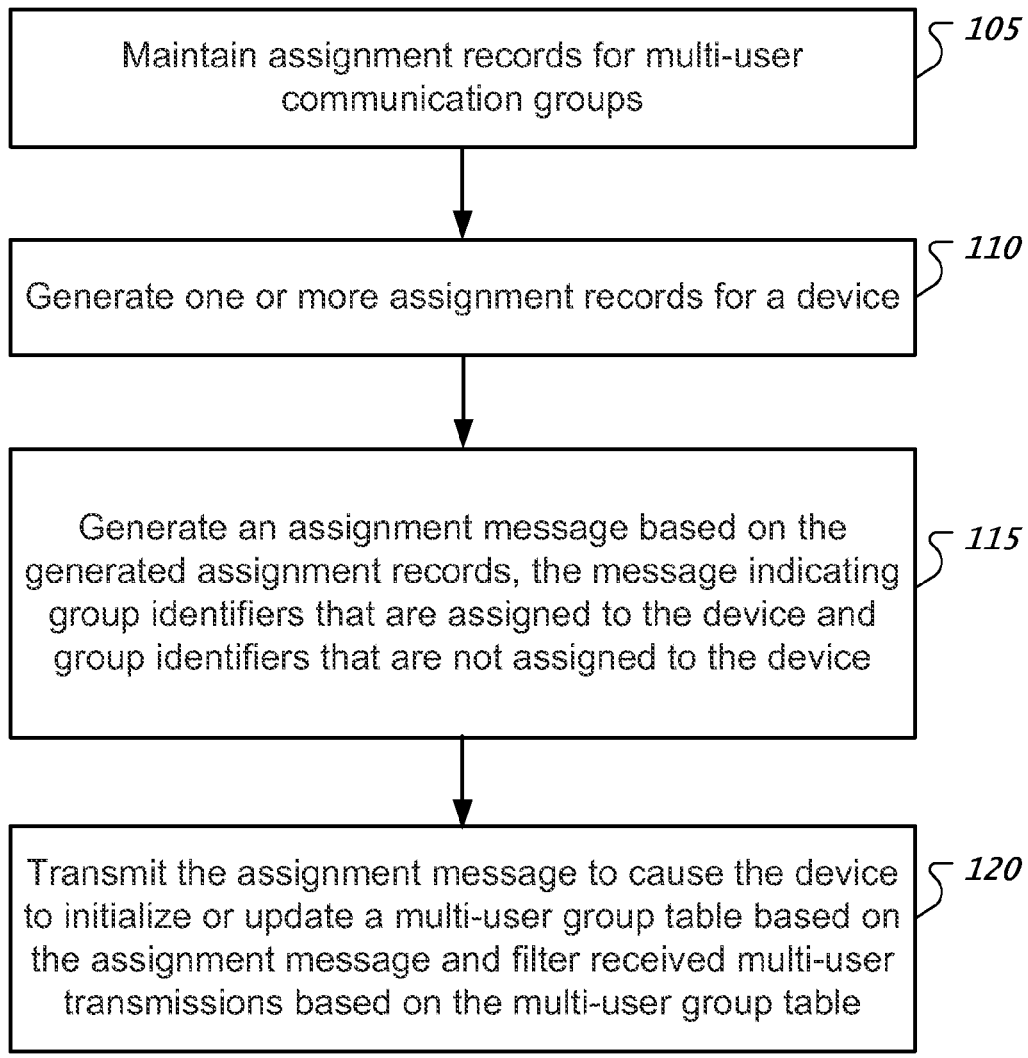
FIG. 1 shows an example of a communication process.

FIG. 1 shows an example of a communication process. The communication process can be performed by a wireless communication device such as an access point. At 105, the access point can maintain assignment records for multi-user communication groups. The assignment records can be used to communicate with wireless communication devices. Assignment records can include an assigned group identifier (GID) and an assigned group member identifier (GMI). The assigned group identifier can identify at least one of the multi-user communication groups. The assigned group member identifier can identify at least one spatially steered stream within a multi-user transmission that is associated with the assigned group identifier.

At 110, the access point can generate one or more assignment records for a device. For example, the access point can generate one or more assignment records for a newly discovered device that has come within a wireless communication range of the access point.

At 115, the access point can generate an assignment message based on the generated assignment record(s). The assignment message can indicate group identifiers and group member identifiers that are assigned to the device. Also, the assignment message can indicate group identifiers that are not assigned or no longer assigned to the device. The assignment message can indicate one or more group identifiers that are assigned to the device and one or more group identifiers that are not assigned to the device. In some cases, the access point sends a record that includes a group identifier and an unassigned status indication to inform a device that it is no longer assigned to that group identifier. In some implementations, a record that identifies a GID value, but does not identify any group member identifier assignments, indicates to the receiving device an unassigned status indication for that GID value.

At 120, the access point can transmit the assignment message to the device. The assignment can cause the device to (i) initialize or update a multi-user group table based on the assignment message and (ii) filter received multi-user transmissions based on the multi-user group table. Transmitting the assignment message can include sending the assignment message via a unicast channel. Based on a successful reception, the assignment message can cause the device to send an acknowledgement. In some implementations, the assignment message includes a message integrity check (MIC) value. The device can be configured to send a confirmation based on a successful verification of the MIC value or a suspected attack notification based on an unsuccessful verification of the MIC value.

An access point can, in some implementations, identify, based on the maintained assignment records, an assignment record based on a performance characteristic (e.g., bit-error-rate or a spatial diversity metric). Identifying an assignment record based on a performance characteristic can include identifying at least one of the maintained assignment records that is associated with a lack of spatial diversity for a spatial division multiple access based transmission. Generating the assignment records, at 110, can include assigning an assigned group identifier and group member identifier included in the identified assignment record to a device, such as a newly discovered device. In some cases, the device currently assigned to the identified record is informed that it is no longer assigned to the record, and the record is reassigned to the newly discovered device. In some cases, the identified assignment record becomes assigned to both the newly discovered device and the device currently assigned to the record.

In some implementations, generating the assignment records, at 110, can include assigning a combination of a group identifier and a group member identifier to the device. The combination can be shared among two or more devices. In some implementations, an access point can assign a group identifier to two or more device groupings. Generating assignment records, at 110, can include generating an assignment record that includes the group identifier that is assigned to the two or more device groupings.

An assignment message can include the identifiers of the groups assigned to a device and the identifiers of the groups not assigned to the device. In some implementations, an assignment message can include one or more assignment records for making an assignment and one or more assignment records for revoking an assignment or indicating a non-assignment. For the assignment records associated with the assigned groups, the assignment records can contain an "assigned" indication and a group member identifier. For the assignment records associated with the unassigned groups, the assignment records can contain an "unassigned" indication. In some implementations, an assignment message can be arranged so that a receiving device can copy the contents of the message in to the device's memory as a multi-user group table. Copying the message content into memory can including replacing an existing multi-user group table.

In some implementations, an assignment message includes an updated multi-user group table for a device to replace an existing multi-user group table. If some assignment records are present in an existing multi-user group table, but are not present in the updated multi-user group table, these multi-user groups are considered to be purged. If some assignment records are present in both the existing multi-user group table and the updated multi-user group table, but the group member identifiers are changed, these multi-user groups are considered to be updated. If some assignment records are present in both the existing multi-user group table and the updated multi-user group table, and the group member identifiers are not changed, these multi-user groups are unchanged. If some assignment records are present only in the updated multi-user group table, but not in the old one, these multi-user groups are considered to be new assignments.

In some implementations, based on a limited number of GID values, GID assignments can be reloaded for a large network. For example, the number of GID values can be limited to 64 and the GID assignments can be reloaded for a large network that has more than 64 device combinations. In some implementations, a GID can be assigned to multiple multi-user groups, with each multi-user group having a different combination of devices. For example, two different devices can be assigned to the same assignment record (e.g., assigned to the same GID and GMI). In some cases, a device may share some of the GID and GMI values with some of the devices and share some other GID and GMI values with some other devices.

Wireless communication devices can be configured to implement one or more techniques described herein. Such a device, for example, can include circuitry to access a wireless communication interface and processor electronics configured to perform one or more of the described techniques. A wireless communication interface can include circuitry to transmit and receive wireless communication signals. In some implementations, a communication process running on a wireless communication device sends a digital signal(s) indicative of two or more Space Division Multiple Access (SDMA) based streams to a wireless communication interface, which converts the digital signal(s) into an analog signal(s). Transmitting a multi-user transmission can include transmitting signals that concurrently provide separate data to two or more devices.

Wireless communication devices can transmit and receive one or more data elements during a transmission opportunity (TXOP). Various examples of data elements include a data unit, a portion of a data unit, or a string of one or more bits. Other types of data elements are possible. A data unit can be based on an aggregate data unit format that specifies signaling for aggregating multiple medium access control (MAC) data units (e.g., MAC protocol data units (MPDUs)) into aggregate data unit (e.g., aggregated MPDU (A-MPDU)). Devices that are SDMA enabled can transmit and receive one or more multi-user (MU) transmissions (e.g., multi-user frames). For example, a device such as an access point can transmit a multi-user frame to two or more SDMA enabled client devices, the multi-user frame containing spatially steered data frames (e.g., spatially steered frames containing respective A-MPDUs) for the respective devices.

Figure 2:
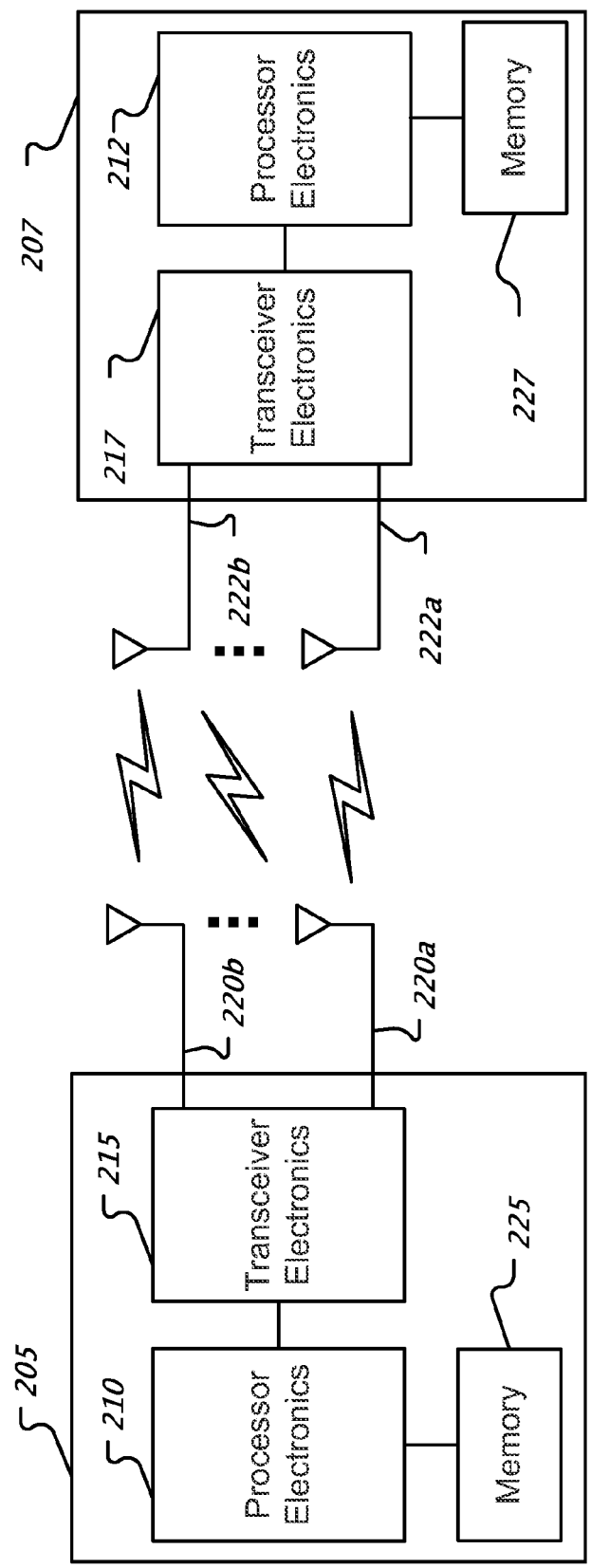
FIG. 2 shows an example of a wireless network including two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. Wireless communication devices 205, 207 can communicate with one or more types of devices (e.g., devices based on different wireless communication standards) such as a high-throughput (HT) device (e.g., IEEE 802.11n based device) or a very high-throughput (VHT) device (e.g., IEEE 802.11ac based device).

In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include analog and digital circuitry. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

A first wireless communication device 205 can transmit data to one or more devices via two or more spatial wireless communication channels such as orthogonal spatial subspaces, e.g., orthogonal SDMA subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency range.

Wireless communication devices, such as a MIMO enabled access point, can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
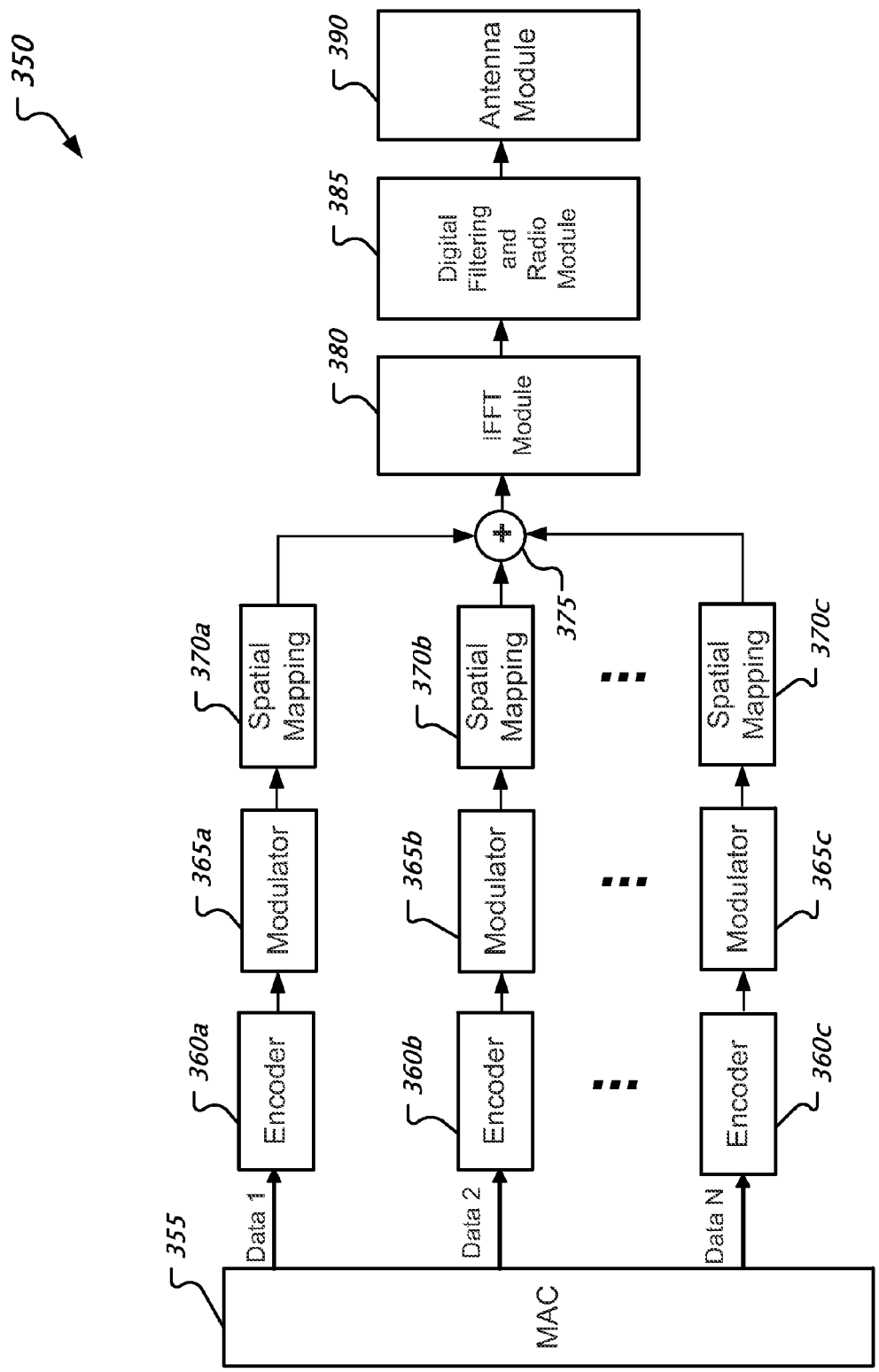
FIG. 3 shows an example architecture of a wireless communication device.

FIG. 3 shows an example of a wireless communication device architecture, which can include the various implementation details described herein. A wireless communication device 350 can produce signals for different clients that are spatially separated by respective spatial multiplexing matrices $W_i$, e.g., steering matrices. Each $W_i$ is associated with a subspace. The wireless communication device 350 includes a MAC module 355. The MAC module 355 can include one or more MAC control units (MCUs) (not shown).

The wireless communication device 350 includes three or more encoders 360a, 360b, 360c that receive data streams, from the MAC module 355, for N respective client devices. The encoders 360a-c can perform encoding, such as a forward error correction (FEC) encoding technique to produce respective encoded streams. Modulators 365a, 365b, 365c can perform modulation on respective encoded streams to produce modulated streams provided to spatial mapping modules 370a, 370b, 370c.

The spatial mapping modules 370a-c can access a memory (not shown) to retrieve a spatial multiplexing matrix $W_i$ associated with a data stream's intended client device. In some implementations, the spatial mapping modules 370a-c access the same memory, but at different offsets to retrieve different matrices. An adder 375 can sum spatially steered outputs from the spatial mapping modules 370a-c.

An Inverse Fast Fourier Transform (IFFT) module 380 can perform an IFFT on an output of the adder 375 to produce a time domain signal. A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355. In some implementations, a host processor includes a MAC module 355.

A MAC module 355 can generate a MAC Service Data Unit (MSDU) based on data received from higher level protocols such a Transmission Control Protocol over Internet Protocol (TCP/IP). A MAC module 355 can generate a MAC Protocol Data Unit (MPDU) based on a MSDU. In some implementations, a MAC module 355 can generate a Physical Layer Service Data Unit (PSDU) based on a MPDU. For example, a wireless communication device can generate a data unit (e.g., a MPDU or a PSDU) that is intended for a single wireless communication device recipient. A Physical Layer Protocol Data Unit (PPDU) can encapsulate a PSDU.

A wireless communication device 350 can perform omnidirectional transmissions that are intended for multiple client devices. For example, the MAC module 355 can operate a single data pathway between the MAC module 355 and the IFFT module 380 to cause an omni-directional transmission. The device 350 can perform steered transmissions that concurrently provide separate data to multiple client devices. The device 350 can alternate between omni-directional transmissions and steered transmissions. In steered transmissions, the device 350 can transmit a first PPDU to a first client via a first spatial wireless channel and concurrently transmit a second PPDU to a second client via a second spatial wireless channel.

An access point can create different groupings of devices to optimize multi-user transmissions. A group of devices can be assigned a group identifier (GID). Members of the group can be assigned respective group member identifiers (GMIs). A multi-user transmission can include a GID and one or more GMIs that corresponding to a presence of steered data for one or more devices, respectively. A device can decode a GID and GMI in a multi-user transmission to determine whether to process the remaining portion of the multi-user transmission. For example, based on the received GID and the received GMI matching a device's stored GID and stored GMI, the device can process the remaining portion. Note that a device can be assigned to multiple GIDs and multiple GMIs. The access point can use one or more grouping techniques to create groupings. This document includes details and examples of various grouping techniques.

Figures 4A, 4B:
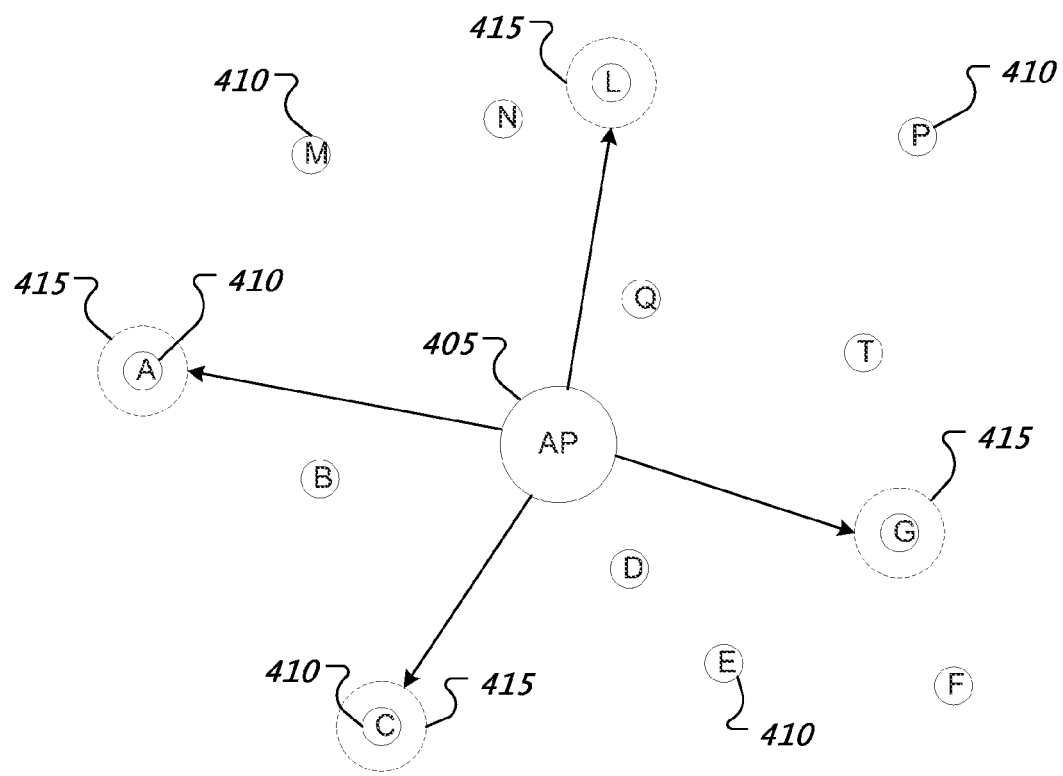
FIGS. 4A and 4B show an example of group member identifier assignments for a group identifier based on a heterogeneous spatial grouping technique.

FIGS. 4A and 4B show an example of GMI assignments for a GID based on a heterogeneous spatial grouping technique. An access point 405 can communicate with multiple client devices 410. The access point 405 can place two or more of the client devices 410 with sufficient spatial diversity in a multi-user group, which is assigned a GID. Members 415 of the multi-user group are enclosed by dashed circles in FIG. 4A. Each client devices 410 in the multi-user group is assigned a GMI. Two devices that lack sufficient spatial diversity can be assigned to two different multi-user groups. In FIG. 4B, a table 420 includes example values for a GID and example GMI value assignments for respective members 415 of the multi-user group. In the table 420, devices G, L, A, and C are respectively assigned to GMI values of 1, 2, 3, and 4 for the GID value of 30. Other values and assignments are possible. Moreover, a client device 410 can be a member of more than one multi-user group. A multi-user transmitter, such as the access point 405, can group client devices with pending data into a multi-user group and sound the client devices. Based on the sounding feedbacks from the client devices, the multi-user transmitter can decide whether any of the client devices are suitable or unsuitable to be group together.

To measure spatial diversity, the access point 405 can use one or more sounding techniques that include sending test frames to the client devices 410. Spatial diversity can change (e.g., movement of the devices) and the determination of the groupings can be periodically reassessed. Client devices not in a multi-user group that is identified in an incoming multi-user frame are not required to process the multi-user frame, thus allowing such client devices to save power.

Figure 5:
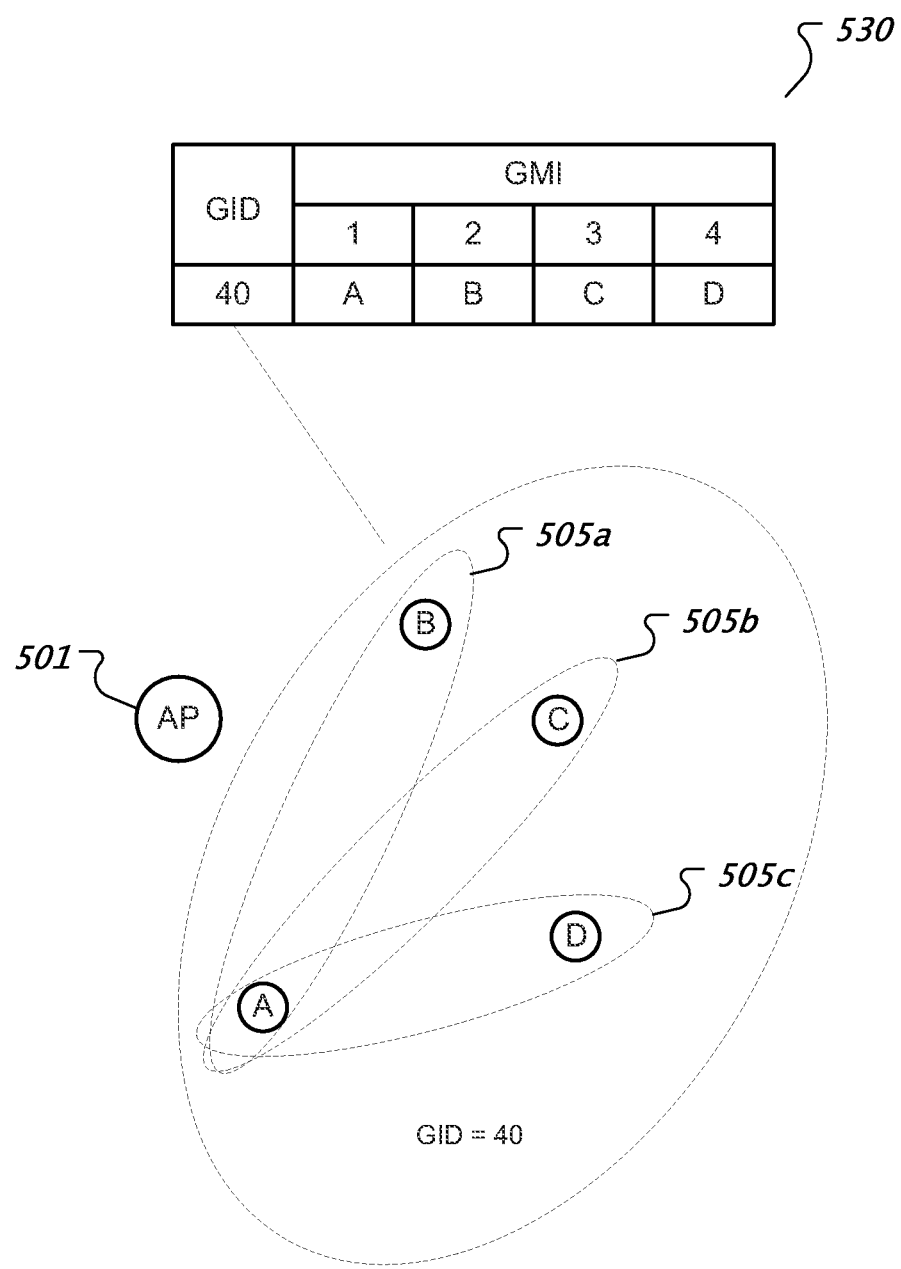
FIG. 5 shows an example of a multi-user group assignment technique.

FIG. 5 shows an example of a multi-user group assignment technique. The same GID can be assigned to two or more groupings of device. In this example, an access point 501 assigns the same GID (e.g., GID=40) to a multi-user group that includes three device subgroups: {A, B} 505a, {A, C} 505b, and {A, D} 505c, where B, C, and D are assigned different GMIs (e.g., GMI for A is 1, B is 2, C is 3, and D is 4). A table 530 in FIG. 5 shows example of values for a GID and example of GMI value assignments for respective members of the multi-user group. In some implementations, an access point 501 assigns the same GID to two or more groupings, and the same combination of a GID value and a GMI value can be assigned to two or more devices.

A GID space may be constrained to a limited set of values (e.g., values represented by 4 bits, 5 bits, or 6 bits). A limited set of values may not cover all possible multi-user combinations of a large group of wireless communication devices. An access point can perform GID reloading to cover additional multi-user combinations. In some reloading techniques, a GID is assigned to multiple sub-groups of devices (e.g., subgroups 505a-c of FIG. 5), and a specific combination of a GID and a GMI is assigned to only one device at a time. Based on these techniques, a transmitted MU-PPDU only includes PPDUs to one of the sub-groups. In some other reloading techniques, a GID is assigned to multiple groups and a specific combination of a GID and a GMI can be assigned to multiple devices. Based on these techniques, a MU-PPDU only includes PPDUs to one of the groups, where devices sharing the same GID have to process the MAC header of the MU-PPDU to ascertain whether to process the rest of the MU-PPDU. In some cases, devices sharing the GID, but are not the intended recipient of the MU-PPDU, attempt to decode the MU-PPDU, but most likely cannot decode the MU-PPDU due to an unmatched beam forming direction, and therefore conclude that the MU-PPDU is intended for another device.

In some current wireless system designs, a GID assignment frame that carries only a subgroup GID/GMI assignment (e.g. {GID=20: A, 0, C, 0}, where the position of "A" corresponds to a GMI of 1 and the position of "C" corresponds to a GMI 3), the GID assignment frame shall not be used to purge existing assignment records for other subgroup members. Moreover, in some current wireless system designs, a GID assignment frame that carries all of the group members (e.g., {GID=50, A, B, C, D}) shall not be used to purge the existing assignment records in other group(s) that share the same GID. In other words, due to GID/GMI reloading, a GID assignment frame that carries GID/GMI assignment for a device or a group of devices cannot be used to purge an existing assignment with a same GID since the new assignment can be a reloaded assignment, instead of a replacement assignment. Such designs may increase message traffic associate with group assignments.

A wireless communication system can be implemented with reduced assignment message traffic. In some implementations, an access point can send a frame such as a GID purge frame or a GID update frame to delete or change existing assignment records in a client device. In some implementations, a reloading flag can be included in a GID assignment frame to indicate whether it is a reloaded GID assignment or an exclusive GID assignment. In some implementations, a reloaded GID assignment cannot delete an existing assignment record in a client device. In some implementations, an exclusive GID assignment can be used to delete or change an existing assignment record.

In some implementations, a GID assignment frame does not include only a subgroup assignment or a partial group assignment. In some implementations, a partial assignment flag is included in the GID assignment frame to indicate whether the frame indicates a partial group assignment or a complete group assignment. In some implementations, a partial group assignment frame cannot delete an existing assignment record in a client device.

An access point can pre-allocate GIDs to cover all possible multi-user groupings of client devices when the number of devices is small (e.g., 3 or less devices). When joining the network, each client device can acquire all GID assignments that cover all or most grouping combinations with other client devices. In some implementations, GIDs/GMIs can be pre-assigned to all possible client device combinations without reloading any GID. Based on a m-bit GID field, the total number of GID values is $2^m$. If each multi-user group contains 4 devices, for example, the 4-device combinations among n devices are combination (n, 4). To avoid overloading, pick m such that $2^m \geq$ combination (n, 4). Based on a 5-bit GID, the maximum number of client devices without overloading is 6. Based on a 6-bit GID, the maximum number of client devices without overloading is 7. Based on an 8-bit GID, the maximum number of client devices without overloading is 10. The access point does not need to assign GIDs again before MU transmission. In some implementations, the value for m can be limited, and overloading can occur (e.g., $2^m <$ combination (n, 4)).

When an access point starts a network, the access point can pre-assign available GIDs/GMIs to cover all possible combinations of newly joined client devices without reloading GIDs. With the joining of more client devices, GIDs and GMIs can become exhausted and the access point can start to place client devices with insufficient space diversity in the same set, e.g., assigning the same GIDs and GMIs. For example, based on a 6-bit GID space, an access point first exhausts GIDs and GMIs to cover all combinations of the first 7 client devices. For example, the first 7 client devices can be put in different subspaces without checking their mutual space diversities. When more than 7 client devices join the network, the access point starts to divide the space in to 7 subspaces, and places client devices with insufficient space diversity in the same subspace. In other words, client devices placed to the same subspace can share the same GMIs/GIDs. In some implementations, the access point removes the GIDs and GMIs assignments that will not be used at least in the near future, and reassigns these GIDs and GMIs to new client devices.

GIDs and GMIs assignments can be dynamically reloaded to cover some special cases, such as the cases that cannot be covered using pre-assignments, or client devices belonging to the same subspace. In some implementations, a known amount of GIDs can be reserved for special energy-saving groups or same-subspace groups. Client devices placed in the same subspace can share the same GID/GMI, or share a same set of GIDs/GMIs. Client devices may have to decode all multi-user frames associated with the shared GIDs/GMIs, although a multi-user frame may be intended for fewer devices (e.g., one client device in the subspace). One or more client devices can have a power-saving requirement. One or more reserved GIDs/GMIs can be assigned to client devices with a power-saving requirement, so that each of these reserved GIDs/GMIs is assigned only to one device. Thus, these power-saving client devices need not share GIDs/GMIs with other client devices placed in the same subspace to avoid decoding frames destined for other devices.

A wireless communication system, in some implementations, can use GIDs and GMIs that are pre-assigned, but by default are placed in an inactive status. The access point can activate one or more assignment records in one or more client devices by transmitting information such as a GID Activation frame or GID Activation information element included in a sounding frame. When an assignment record is activated, a client device starts to process multi-user frames associated with the assignment record. Each assignment entry has a timer, and the timer is reset whenever an associated multi-user frame is received. The timer may not be reset if the client device is not one of the intended recipients indicated by the multi-user frame. When the timer expires, the assignment entry is deactivated. An access point can send information such as a GID Deactivation frame or an information element (IE) to deactivate one or more assignment records in one or more client devices.

An access point can assign the same GID and GMI to one or more client devices or one or more groups of client devices. In some implementations, the access point can pre-assign GIDs and GMIs to a single client device at association time. In some implementations, the access point can pre-assign GIDs and GMIs to one or more groups of client devices after initial sounding. In some implementations, the access point can dynamically assign GIDs and GMIs, or adjust existing assignments, to one or more groups of client devices based on one or more of sounding updates, traffic conditions, and network status. In some cases, GIDs and GMIs can be pre-assigned to cover all possible client device combinations in a small network without any reloading. In some cases, GIDs and GMIs assignment can be adjusted dynamically based on sounding feedbacks. In some cases, GIDs and GMIs assignment can be adjusted dynamically as the network grows or changes.

Figure 6A:
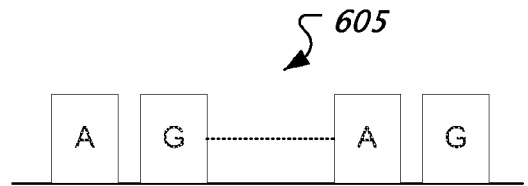
FIGS. 6A, 6B, 6C, and 6D show an example of a timeline sequence of a multi-user grouping and sounding process.
Figure 6B:
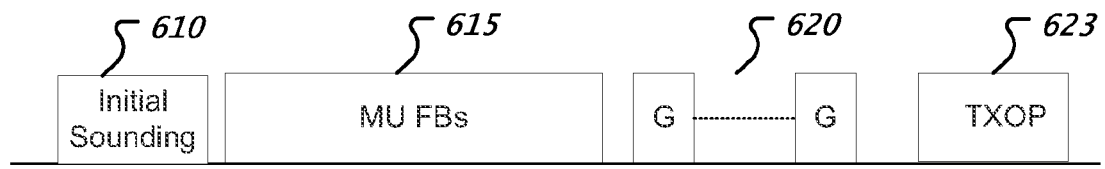

FIGS. 6A, 6B, 6C, and 6D show an example of a timeline sequence of a multi-user grouping and sounding process. An access point can perform a multi-user grouping and sounding process with one or more client devices. In FIG. 6A at 605, the access point pre-assigns one or more multi-user groups after associations. For example, based on an association of a new device, the access point sends one or more predetermined assignment records to the new device. In FIG. 6B at 610, the access point performs sounding for one or more client devices. At 615, the access point receives sounding feedback data from the one or more client devices. The access point uses the sounding feedbacks to determine whether to form or adjust one or more multi-user groups. At 620, the access point sends assignment messages with updated multi-user group information. At 623, the access point obtains a TXOP to transmit multi-user frames to the assigned multi-user groups.

Figure 6C:
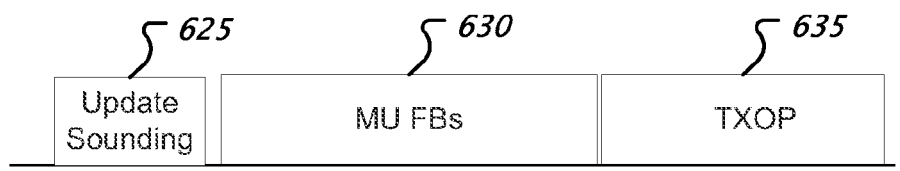

At 625 in FIG. 6C, the access point can perform a sounding update. For example, the access point can perform a sounding update for one or more multi-user groups. At 630, the access point receives sounding feedback data from the one or more client devices. At 635, the access point obtains a TXOP to transmit multi-user frames to the multi-user groups based on the updated multi-user beam forming matrix, which can be determined based on the updated sounding feedback.

Figure 6D:
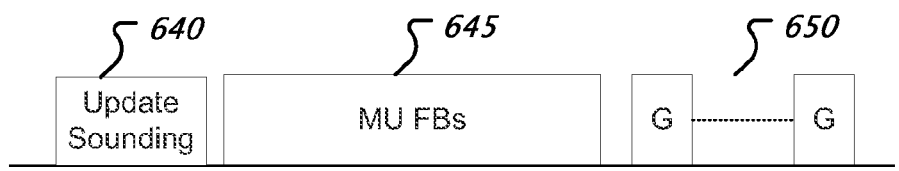

At 640 in FIG. 6D, the access point can perform another sounding update. For example, the access point can perform a sounding update for one or more multi-user groups. At 645, the access point receives sounding feedback data from the one or more client devices. At 650, the access point can send updated assignment records to regroup client devices based on sounding feedbacks.

An access point can transmit assignment messages to inform devices of their respective GID and GMI assignments. An assignment message can include one or more assignment records. In some implementations, an assignment record includes a GID value and a GMI value. One or more assignment messages can be included in an assignment frame (e.g., a GID assignment frame). The access point can send one or more types of GID assignment frames, such as a unicast GID assignment frame or a multicast GID assignment frame.

A unicast GID assignment frame can assign one or more GIDs and GMIs to a client device. An access point can send a unicast GID assignment frame to an individual client device to cause the device to add or update one or more assignment records. A unicast frame to an individual client device can cause the client device to send an acknowledgement. In some implementations, a unicast frame sent to an individual client device can be protected and can be confirmed. In some implementations, a unicast assignment frame (e.g., unicast GID assignment frame) can be defined as a robust management/action frame. A robust unicast management frame can be encrypted.

A multicast GID assignment frame can assign GIDs and GMIs to one or more multi-user groups. An access point can send a multicast GID assignment frame to one or more client devices or one or more groups of client devices to add one or more assignment records at each client device. At a client device, a received multicast frame can be acknowledged, confirmed, or protected. In some implementations, the multicast frame can be an Action-No-Ack frame. Based on detecting a lack of a response from a device to a MU transmission, an additional unicast frame to add an assignment record at the specific device can be sent to the device.

An access point can update one or more assignment records via a unicast frame or a multicast frame. For example, an access point can send a unicast frame to an individual client device to update one or more assignment records at that client device. In another example, an access point can send a multicast frame to one or more client devices or one or more groups of client devices to update one or more assignment records at each client device.

An access point can send a unicast frame to an individual client device to delete one or more assignment records. The client device can be required to acknowledge the unicast frame. The unicast frame can be protected and be confirmed. An access point can send a Multicast frame to one or more client devices or one or more groups of client devices to delete one or more assignment records at each client device. A client device can maintain a timer for each record and delete the record if it becomes outdated and send a notification to the access point or MU transmitter.

A malicious GID assignment (e.g., one sent from an attacker) may block client devices from processing multi-user frames. Frames such as a GID assignment frame, GID purge frame, and a GID update frame can include a MIC to guard against malicious activity. Based on a MIC that fails verification, the client device can send a Suspected-DoS-Attack frame or include a Suspected-DoS-Attack reason code in a frame such as a GID confirmation frame or GID purge frame. A dialog token copied from the incoming GID frame can be included in a frame such as a Suspected-DoS-Attack frame, a GID confirmation frame, or a GID purge frame. If the incoming GID frame is indeed from the access point, the access point sends the frame again; otherwise, the access point keeps silent or sends a GID assignment frame to the client device to confirm all active GID assignments to the client device.

Figure 7:
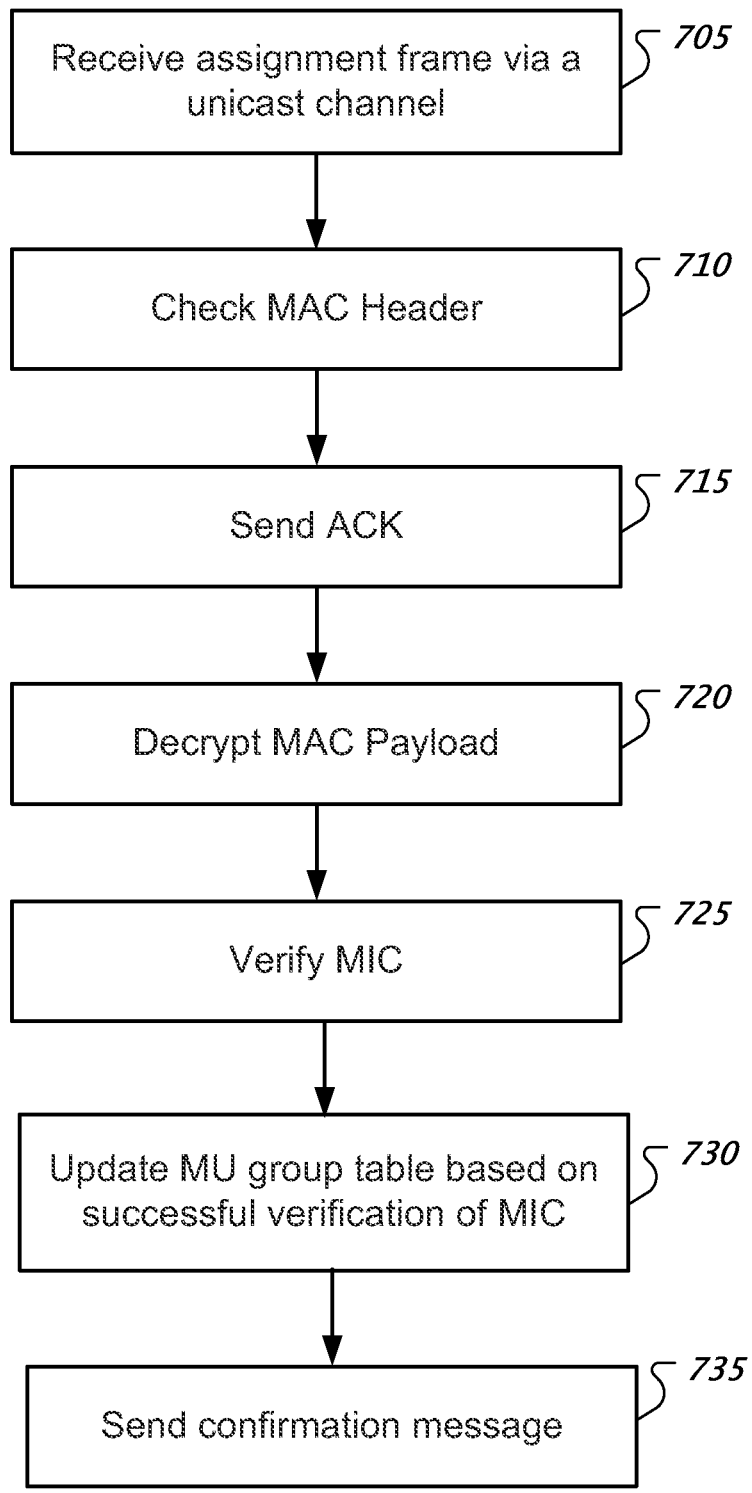
FIG. 7 shows an example of a process for handling a received assignment frame.

FIG. 7 shows an example process for handling a received assignment frame. At 705, a client device receives an assignment frame via a unicast channel from an access point. The assignment frame includes a MAC header and a MAC payload. The payload includes an assignment message. In this example, the payload in encrypted. At 710, the client device checks a MAC header included in the assignment frame. Based on a successful check of the MAC header (e.g., indicated recipient is the actual recipient) and a frame check sequence (FCS), the client device, at 715, sends an acknowledgement (ACK). At 720, the client device decrypts the MAC payload included in the assignment frame. The client device can extract an assignment message from the decrypted MAC payload. This message can include a MIC. In some implementations, the MIC is separate from the assignment message. In some implementations, the MAC payload is not encrypted and, accordingly, MAC payload decryption is not required. At 725, the client device verifies the MIC. At 730, the client device updates a multi-user group table based on a successful verification of the MIC. At 735, the client device sends a confirmation message to the access point.

For a client device, decryption and verification of the assignment message can cause a long delay before the device updates a multi-user group table, sends a response, or both. If the frame is protected by a Broadcast Integrity Protocol (BIP) or a Multicast Integrity Protocol (MIP) (e.g. a broadcast frame, or a multicast frame), the client device can parse the frame quickly and can verify the frame later on. If the frame includes encrypted content, such as a unicast frame, the device may parse the MAC header quickly, but may require additional time to decrypt and verify the MAC payload. For the BIP protection case, a temp assignment record can be added right after the frame parsing, and before MIC verification. Based on a MIC verification, the device changes a multi-user group table. A temp assignment record can be added based on an Associated Identifier (AID) or a MAC address match, and a GID of the assignment record is not yet recorded. Once the temp assignment record is added, the device can start to process the MU-PPDUs conforming to the temp record. When the MIC is verified, the temp assignment record becomes a formal record. If the MIC does not pass verification, the temp assignment record is deleted.

FIG. 8A shows an example layout of a GID management frame format for a broadcast transmission. An access point can broadcast a GID assignment frame 800 to control group assignments on multiple devices. A MAC header in the frame 800 (not shown) can include a broadcast address of the intended recipients of the frame 800. In the frame 800, an action field 805 can indicate that the frame 800 is a GID management frame. A function field 810 can indicate that the frame 800 is a GID based operation such as a GID Assignment, GID Assignment Update, or a GID Purge operation. A first quantity field 815 value indicates the number of client devices (e.g., the number of devices) addressed in the frame 800. Moreover, the first quantity field 815 value indicates the number of Associated Identifiers (AIDs) 820a, 820b, 820c included in the frame 800. In this example, there are N AIDs (N>1) and each AID corresponds to a separate client device.

In the frame 800, a second quantity field 825 can indicate the number of multi-user groups (e.g., the number of device groups) covered by the frame 800. The second quantity field 825 value indicates the number of multi-user group records 830a, 830b included in the frame 800. A multi-user group record 830a-b includes the GID of the corresponding multi-user group. The multi-user group record 830a-b includes a vector of GMI values for corresponding AIDs in the order indicated by the listing of the AIDs 820a-c. Other arrangements for GMI values in a record are possible. A nonzero GMI value indicates that the corresponding AID, and therefore the corresponding device, is assigned the multi-user group and that GMI value. A zero GMI value indicates that the corresponding AID, and therefore the corresponding device, is not assigned to the multi-user group.

FIG. 8B shows an example layout of a GID management frame format for a unicast transmission. An access point can transmit a GID assignment frame 801 to control group assignments on a single device via a unicast channel. A MAC header in the frame 801 (not shown) can include a radio address of the intended recipients of the frame 801. In the frame 801, an action field 806 can indicate that the frame 801 is a GID management frame. A function field 811 can indicate that the frame 801 is a GID based operation such as a GID Assignment, GID Assignment Update, or a GID Purge operation. In the frame 801, a quantity field 826 can indicate the number of multi-user groups (e.g., the number of devices) covered by the frame 801. Moreover, the quantity field 826 value indicates the number of multi-user group records 850a, 850b, 850c included in the frame 801. In a unicast frame, for example, a multi-user group record 850a-c includes the GID of the corresponding multi-user group and the GMI assigned or not assigned to recipient. Other arrangements for GID and GMI values in the frame 801 are possible. A nonzero GMI value indicates that the recipient is assigned to the corresponding multi-user group and that GMI value. A zero GMI value indicates that the recipient is not assigned to the multi-user group.

Figure 9:
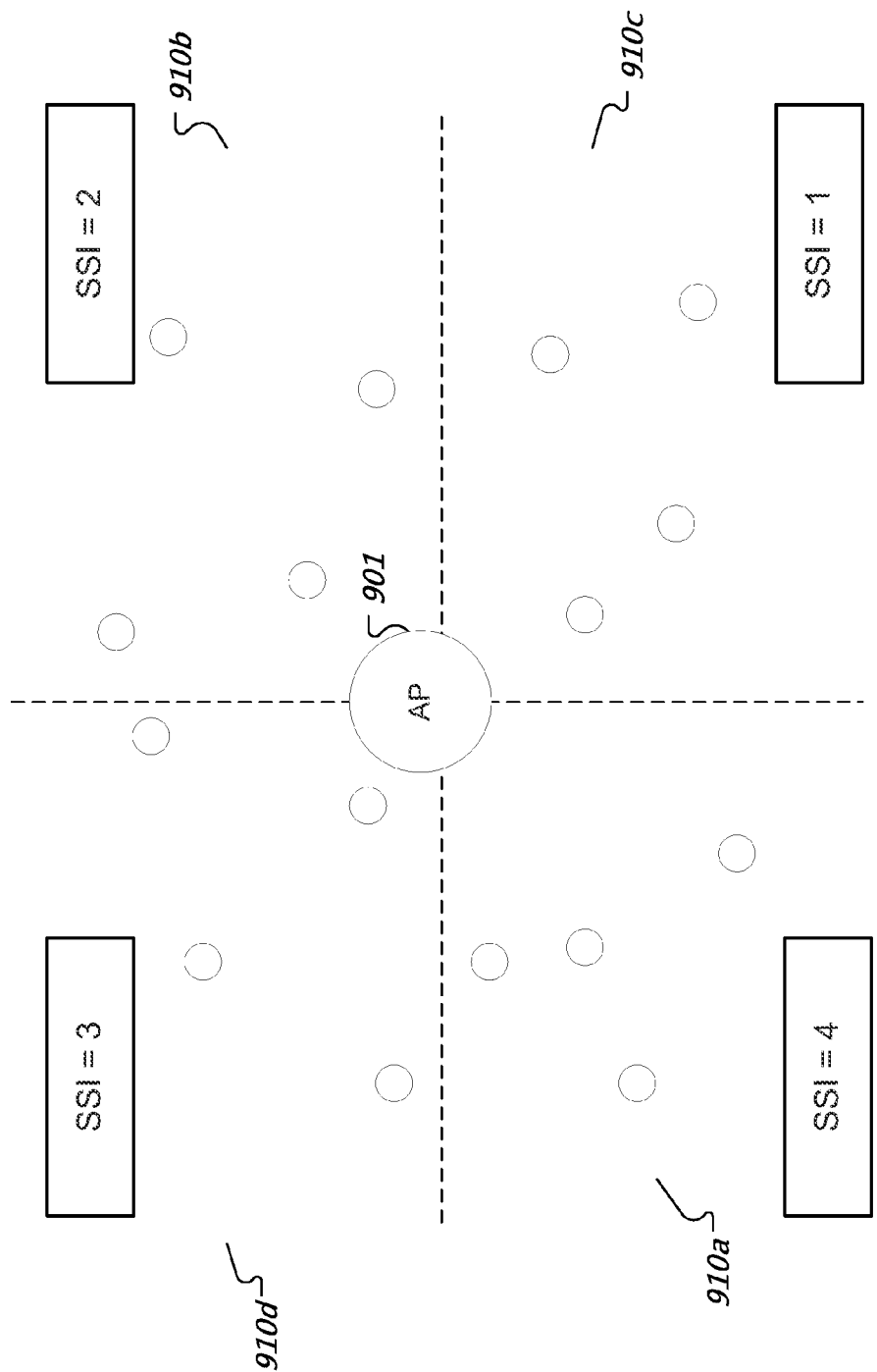
FIG. 9 shows an example of group identifier and group member identifier assignments based on a homogeneous spatial grouping technique.

FIG. 9 shows an example of GID and GMI assignments based on a homogeneous spatial grouping technique. An access point 901 can assign Sub-Space Index (SSI) values that are associated with spatially designated regions 910a, 910b, 910c, 910d surrounding the access point 901. Client devices with inadequate spatial diversity, such as client devices in the same spatial direction, can be assigned the same SSI. For example, client devices not suitable to be placed in the same multi-user group can be assigned to the same SSI. The access point 901 can divide the surrounding space in to two or more separate regions 910a-d, where each region is assigned its own SSI value. In this example, the access point 901 divides the surrounding space in to four regions 910a-d. For a MU transmission, the access point 901 can group client devices having different SSIs.

If the maximum allowed SSIs are less or equal to the maximum allowed GMIs (in a multi-user group), SSIs can be one-to-one mapped to the GMIs. For example, devices assigned a SSI of m will assume GMI=m in any MU transmission.

A wireless communication system can use a hybrid approach where a known GID (e.g., GID=0xFF or a broadcast GID) is assigned to cover all devices that are assigned to the same SSI, here SSI is equivalent to GMI. Once a device is assigned a SSI/GMI with the known GID, the device is required to process received multi-user frames with the known GID. Any other GID can be used to group a certain number of devices, being less than or equal to the maximum allowed GMIs. Devices not assigned the known GID can skip the corresponding multi-user frames and save power. Devices assigned the same SSI can also be grouped and assigned one of the GIDs different from the known GID. One or more GIDs can be reserved for multicast transmissions. Some multicast GIDs can be used to group multiple selected devices from each subspace.

If the maximum allowed SSI value is greater than the maximum allowed GMI value in a multi-user group, each SSI can be mapped to one or more GID/GMI combinations. A mapping table such as a SSI-GMI-GID mapping table can be installed in both transmitting and receiving devices. To minimize the unnecessary processing of multi-user frames and to be fair to client devices (e.g., each client device receives an about equal share of unnecessary multi-user frame processing) a wireless communication system can do one of: (i) an assignment combination can be mapped to minimum number of SSIs, (ii) each SSI can be mapped to a minimum number of GIDs, or (iii) SSIs can receive a fair share of GIDs.

FIG. 10 shows an example of a mapping table for a homogeneous spatial grouping technique. In this example, the number of client devices can be placed into a number of subspaces (there being 8 SSI values in this example) larger than the max GMI number. An access point can generate a mapping table 1005 such as a dynamic SSI-GID-GMI mapping table and deliver the mapping table 1005 to the client devices before MU transmissions. In some implementations, the access point enables partial GID-SSI combinations in the fixed SSI-GID-GMI mapping table, where other combinations having a GMI set to 0. For example, the access point can activate only partial GIDs for certain devices and SSIs. In some implementations, the access point exhausts a GID space first before any reloading, and assigns different GIDs to heavily used multi-user groups. In some implementations, the access point only uses partial SSI numbers, and uses different GIDs to indicate different device combinations that share a same SSI combination.

In some implementations, before assigning SSIs, an access point can conduct initial sounding to collect channel conditions of associated devices. Initial sounding can be a sounding such as a broadcast based sounding or a multicast based sounding with full or selected feedbacks. The access point can assign SSIs based on the initial sounding feedbacks. In some implementations, the access point can skip initial sounding and assign SSIs sequentially or randomly. In an update process, the access point can perform soundings for one or more multi-user groups or for one or more SSI combinations. A SSI can be reassigned to cover a different set of devices or adapt to channel changes at one or more devices. Note that one or more SSI assignments can be included in a sounding or a sounding announcement frames.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
    maintaining assignment records for multi-user communication groups, the assignment records being used to communicate with one or more wireless communication devices, the assignment records comprising an assigned group identifier and an assigned group member identifier, wherein the assigned group identifier identifies at least one of the multi-user communication groups, wherein the assigned group member identifier identifies at least one spatially steered stream within a multi-user transmission that is associated with the assigned group identifier;
    generating one or more assignment records for an additional wireless communication device;
    generating an assignment message that includes the one or more generated assignment records, wherein the assignment message indicates (i) one or more group identifiers and one or more group member identifiers that are assigned to the additional wireless communication device and (ii) one or more group identifiers that are not assigned to the additional wireless communication device, wherein the one or more group member identifiers that are assigned to the additional wireless communication device are indicated by one or more first values included in the assignment message, and the one or more group member identifiers that are not assigned to the additional wireless communication device are indicated by one or more second values included in the assignment message; and
    transmitting the assignment message to cause the additional wireless communication device to (i) initialize or update a multi-user group table based on the assignment message and (ii) filter one or more received multi-user transmissions based on the multi-user group table.

2. The method of claim 1, wherein transmitting the assignment message comprises sending the assignment message via a unicast channel, the assignment message causing the additional wireless communication device to send an acknowledgement and wherein the one or more first values are one or more nonzero values, and the one or more second values are one or more zero values.

3. The method of claim 1, further comprising:
    identifying, based on the maintained assignment records, an assignment record based on a performance characteristic,
    wherein generating the one or more assignment records comprises
        assigning a group identifier of the identified assignment record to the additional wireless communication device, and
        assigning a group member identifier of the identified assignment record to the additional wireless communication device.

4. The method of claim 3, wherein identifying the assignment record based on the performance characteristic comprises identifying a device associated with the identified assignment record and informing the identified device that the identified device is no longer assigned to the identified assignment record.

5. The method of claim 3, wherein identifying the assignment record based on the performance characteristic comprises identifying at least one of the maintained assignment records that is associated with a lack of spatial diversity for a spatial division multiple access based transmission.

6. The method of claim 1, wherein generating the one or more assignment records comprises assigning a combination of a group identifier and a group member identifier to the additional wireless communication device, wherein the combination is shared among two or more wireless communication devices.

7. The method of claim 1, further comprising:
    assigning a group identifier to two or more device groupings, wherein generating the one or more assignment records comprises generating an assignment record that includes the group identifier that is assigned to the two or more device groupings.

8. The method of claim 1, wherein
the assignment message includes a message integrity check (MIC) value,
wherein the additional wireless communication device is configured to send (i) a confirmation based on a successful verification of the MIC value or (ii) a suspected attack notification based on an unsuccessful verification of the MIC value.

9. An apparatus comprising:
a memory to store assignment records for multi-user communication groups, the assignment records being used to communicate with one or more wireless communication devices, the assignment records comprising an assigned group identifier and an assigned group member identifier, wherein the assigned group identifier identifies at least one of the multi-user communication groups, wherein the assigned group member identifier identifies at least one spatially steered stream within a multi-user transmission that is associated with the assigned group identifier; and
processor electronics configured to
generate one or more assignment records for an additional wireless communication device;
generate an assignment message that includes the one or more generated assignment records, wherein the assignment message indicates (i) one or more group identifiers and one or more group member identifiers that are assigned to the additional wireless communication device and (ii) one or more group identifiers that are not assigned to the additional wireless communication device, wherein the one or more group member identifiers that are assigned to the additional wireless communication device are indicated by one or more first values included in the assignment message, and the one or more group member identifiers that are not assigned to the additional wireless communication device are indicated by one or more second values included in the assignment message; and
control a transmission of the assignment message to cause the additional wireless communication device to (i) initialize or update a multi-user group table based on the assignment message and (ii) filter one or more received multi-user transmissions based on the multi-user group table.

10. The apparatus of claim 9, wherein the assignment message is transmitted via a unicast channel, the assignment message causing the additional wireless communication device to send an acknowledgement, and wherein the one or more first values are one or more nonzero values, and the one or more second values are one or more zero values.

11. The apparatus of claim 9, wherein the processor electronics are configured to
identify, based on the maintained assignment records, an assignment record based on a performance characteristic,
assign a group identifier of the identified assignment record to the additional wireless communication device, and
assign a group member identifier of the identified assignment record to the additional wireless communication device.

12. The apparatus of claim 11, wherein the processor electronics are configured to
identify a device associated with the identified assignment record, and
inform the identified device that the identified device is no longer assigned to the identified assignment record.

13. The apparatus of claim 11, wherein the identified assignment record is associated with a lack of spatial diversity for a spatial division multiple access based transmission.

14. The apparatus of claim 9, wherein the processor electronics are configured to assign a combination of a group identifier and a group member identifier to the additional wireless communication device, wherein the combination is shared among two or more wireless communication devices.

15. The apparatus of claim 9, wherein the processor electronics are configured to
assign a group identifier to two or more device groupings, and
generate, for the additional wireless communication device, an assignment record that includes the group identifier that is assigned to the two or more device groupings.

16. The apparatus of claim 9, wherein
the assignment message includes a message integrity check (MIC) value,
wherein the additional wireless communication device is configured to send (i) a confirmation based on a successful verification of the MIC value or (ii) a suspected attack notification based on an unsuccessful verification of the MIC value.

17. A system, comprising:
devices configured for multi-user communications, wherein at least one of the devices is configured to perform operations comprising:
maintaining assignment records for multi-user communication groups, the assignment records being used to communicate with one or more wireless communication devices, the assignment records comprising an assigned group identifier and an assigned group member identifier, wherein the assigned group identifier identifies at least one of the multi-user communication groups, wherein the assigned group member identifier identifies at least one spatially steered stream within a multi-user transmission that is associated with the assigned group identifier;
generating one or more assignment records for an additional wireless communication device;
generating an assignment message that includes the one or more generated assignment records, wherein the assignment message indicates (i) one or more group identifiers and one or more group member identifiers that are assigned to the additional wireless communication device and (ii) one or more group identifiers that are not assigned to the additional wireless communication device, wherein the one or more group member identifiers that are assigned to the additional wireless communication device are indicated by one or more first values included in the assignment message, and the one or more group member identifiers that are not assigned to the additional wireless communication device are indicated by one or more second values included in the assignment message; and
transmitting the assignment message to cause the additional wireless communication device to (i) initialize or update a multi-user group table based on the assignment message and (ii) filter one or more received multi-user transmissions based on the multi-user group table.

18. The system of claim 17, wherein transmitting the assignment message comprises sending the assignment message via a unicast channel, the assignment message causing the additional wireless communication device to send an acknowledgement and wherein the one or more first values are one or more nonzero values, and the one or more second values are one or more zero values.

19. The system of claim 17, the operations further comprising:
   identifying, based on the maintained assignment records, an assignment record based on a performance characteristic,
   wherein generating the one or more assignment records comprises
      assigning a group identifier of the identified assignment record to the additional wireless communication device, and
      assigning a group member identifier of the identified assignment record to the additional wireless communication device.

20. The system of claim 19, wherein identifying the assignment record based on the performance characteristic comprises identifying a device associated with the identified assignment record and informing the identified device that the identified device is no longer assigned to the identified assignment record.

21. The system of claim 19, wherein identifying the assignment record based on the performance characteristic comprises identifying at least one of the maintained assignment records that is associated with a lack of spatial diversity for a spatial division multiple access based transmission.

22. The system of claim 17, wherein generating the one or more assignment records comprises assigning a combination of a group identifier and a group member identifier to the additional wireless communication device, wherein the combination is shared among two or more wireless communication devices.

23. The system of claim 17, the operations further comprising:
   assigning a group identifier to two or more device groupings,
   wherein generating the one or more assignment records comprises generating an assignment record that includes the group identifier that is assigned to the two or more device groupings.

24. The system of claim 17, wherein
   the assignment message includes a message integrity check (MIC) value,
   wherein the additional wireless communication device is configured to send (i) a confirmation based on a successful verification of the MIC value or (ii) a suspected attack notification based on an unsuccessful verification of the MIC value.

* * * * *